D. A. GALT.
COFFEE POT.
APPLICATION FILED APR. 24, 1920.
1,362,616.
Patented Dec. 21, 1920.
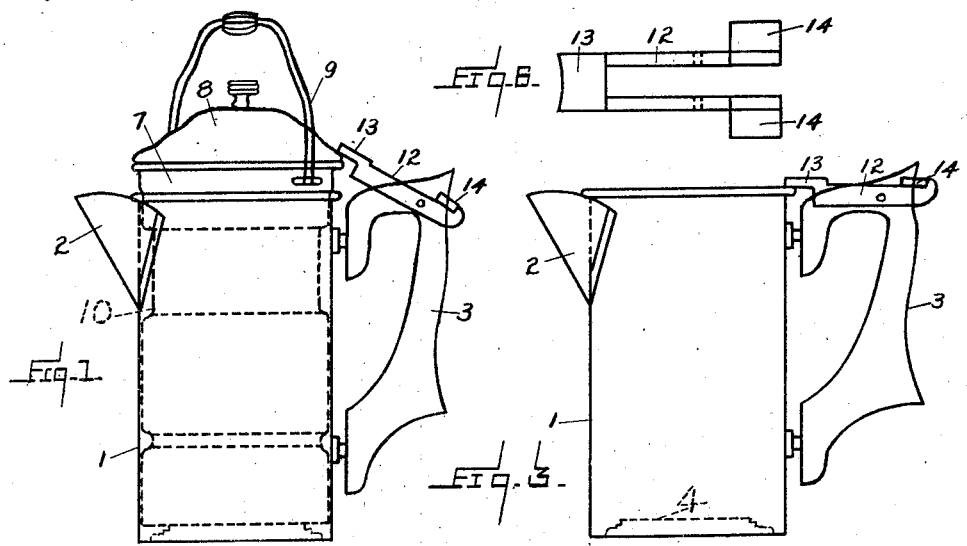
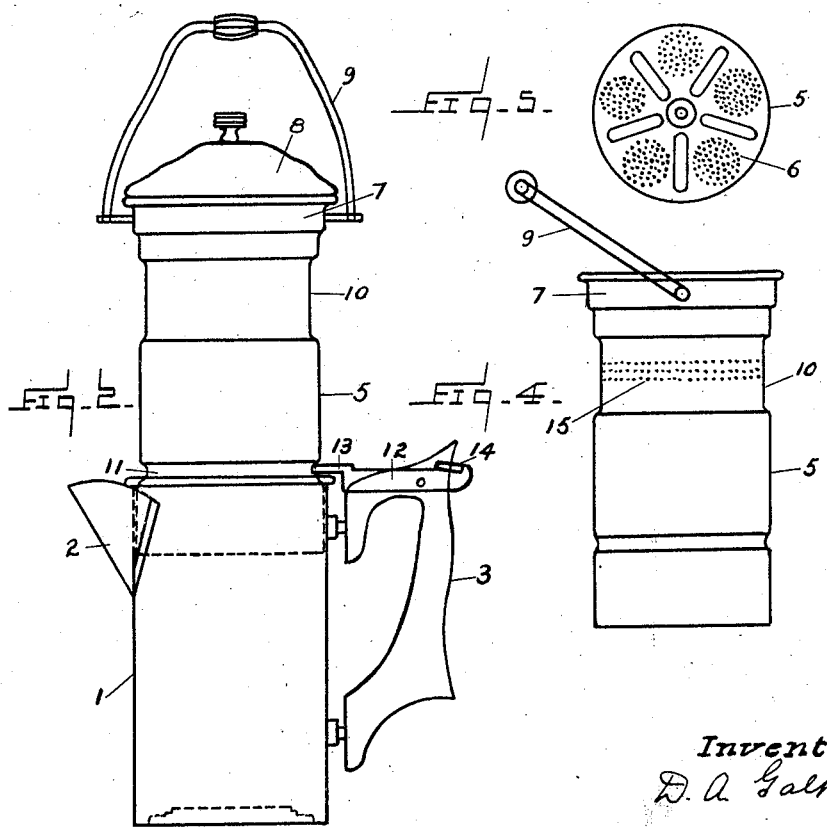
Inventor,
D. A Galt
By E. J. Fetherstonhaugh,
Atty.

UNITED STATES PATENT OFFICE.

DONALD ARTHUR GALT, OF TORONTO, ONTARIO, CANADA.

COFFEE-POT.

1,362,616.          Specification of Letters Patent.     Patented Dec. 21, 1920.

Application filed April 24, 1920. Serial No. 376,235.

*To all whom it may concern:*

Be it known that I, DONALD ARTHUR GALT, a subject of the King of Great Britain, and resident of 1502 King St. west, in the city of Toronto, in the county of York, in the Province of Ontario, in the Dominion of Canada, have invented certain new and useful Improvements in Coffee-Pots; and I do hereby declare that the following is a full, clear, and exact description of the same.

The invention relates to improvements in coffee pots as described in the present specification and shown in the accompanying drawings that form a part of the same.

The invention consists essentially of the novel features of construction whereby the liquid is retained during the percolating process in an inner container provided with an annular recessed portion adapted to permit of the escape of steam from between the two casings through the spout, the bottom of said inner container being perforated to permit of said liquid remaining in the outer receptacle upon the raising of said inner container.

The objects of the invention are to provide a coffee pot by the use of which any one not skilled in the art of making coffee will be enabled to prepare good coffee, to eliminate the danger of the liquid boiling over the pot, and generally to provide a coffee pot which will be inexpensive to construct, efficient and durable.

In the drawings Figure 1 is a side view of the device assembled.

Fig. 2 is a side view showing the inner receptacle in its raised position.

Fig. 3 is a side view of the outer receptacle only.

Fig. 4 is a side view of a modified form of inner receptacle.

Fig. 5 is a bottom view of the inner receptacle.

Fig. 6 is a plan detail of the device employed to hold the inner receptacle to its extended position.

Like numerals of reference indicate corresponding parts in the various figures.

Referring to the drawings 1 is the coffee pot proper consisting of a tubular casing of like circumference throughout its length and being provided with a spout 2 and handle 3 as customary, and having a raised base 4 on the bottom thereof of smaller circumference than said casing, said base having a flat surface and constituting a support for the inner receptacle or strainer.

5 is the inner receptacle or strainer adapted to contain the coffee grounds and the liquid during the percolating process, said container being very slightly less in circumference than the pot 1 and being provided with perforations 6 through the bottom thereof so positioned that when the container is resting on the base 4 said perforations will be closed by said base to prevent the escape of liquid therethrough.

The container 5 is preferably constructed with an enlarged upper end 7 adapted to rest on the top of the pot 1 and forming a support for the cover 8, said enlarged portion also forming a means for securing a handle 9 which may be of any desired design.

The container 5 is concaved or otherwise provided with a comparatively wide annular groove 10 so positioned as to be directly opposite the opening to the spout 2 when said container is resting in its position on the base 4, said groove being for the purpose of permitting of the escape through the spout of the steam rising between the two casings thus serving to prevent boiling over as well as to disperse the steam which is undesirable in the making of coffee.

11 is a comparatively narrow annular groove with which the container 5 is provided adjacent to the lower end thereof and adapted, when the container is raised as is shown in Fig. 2 of the drawings, to receive suitable means for holding said container to the raised position.

The retaining device comprises a pair of arms 12 located one at each side of the handle 3 and being pivotally secured thereto intermediate of their length and being provided with a flat projecting portion 13 adapted, when the container 5 is raised, to fit the groove 11 and thus hold said container to its raised position.

The device also serves as a means for holding the cover 8 to its position when the pot is tilted, the portion 13 serving as a thumb rest to receive pressure for clamping said cover to the container 5 or the pot 1 according to whether or not said container is within said pot.

The rear ends of the arms 12 are preferably provided with projections 14 which may be integral with said arms or secured thereto and being for the purpose of receiving pressure to raise the clamping member 13.

In Fig. 4 of the drawings the sidewall of the container 5, preferably within the groove 10, is provided with perforations 15 to permit of the escape of steam from within said container.

In the use of this invention the container 5 is first placed in position within the pot 1 and the coffee grounds and liquid placed therein and covered by means of the lid 8. The coffee is then left to boil and any steam which may be generated will readily find its way up to the groove 10 and consequently out through the spout 2 and thus prevent boiling over. When it is desired to pour the liquid the container may be entirely removed or raised a sufficient height to permit of the insertion of the finger 13 within the groove 11 thus permitting the liquid to flow through the perforations 16 in the bottom of the container into the pot 1 for pouring.

What I claim is:—

1. In a coffee pot, an outer casing provided with a fluid outlet through the wall thereof and a handle, an inner casing fitting said outer casing and having a perforated bottom, said inner casing being concaved annularly opposite said fluid outlet, and means pivoted to said handles for holding said inner casing in an elevated position in relation to said outer casing.

2. In a coffee pot, an outer casing provided with a fluid outlet through the wall thereof and a handle, the bottom of said casing being convexed inwardly forming a central supporting base, an inner casing fitting said outer casing and adapted to rest on said base, the bottom of said inner casing being provided with perforations adapted to be covered by said base, said inner casing being grooved annularly opposite said fluid outlet and means pivoted to said handle for holding said inner casing in an elevated position in relation to said outer casing.

3. In a coffee pot, an outer casing provided with a fluid outlet through the wall thereof and a handle, an inner casing fitting said outer casing and projecting over the top edge thereof and having its bottom wall perforated, said inner casing being provided with a comparatively wide perforated annular groove located opposite to said outlet and pivoted means from said handle adapted to engage said inner casing to hold same in an elevated position in relation to said outer casing.

4. In a coffee pot, an outer casing provided with a fluid outlet, a spout secured over said outlet, a handle secured to said casing, an inner container fitting said casing and supported at opposite ends thereby, and provided with a perforated bottom, said inner casing being reduced in circumference intermediate of the length thereof to permit of the escape of steam from said spout, said inner casing being also provided with an annular slot adjacent to the lower end thereof, and a clamping element pivoted to said handle and adapted for engagement with said slot in the elevated position of said inner container.

5. In a coffee pot, an outer casing provided with a fluid outlet, an inner casing fitting said outer casing and supported at opposite ends thereby, and constituting a container for the liquid during preparation, said inner casing being reduced in circumference intermedate the ends thereof and slotted annularly adjacent to the lower end thereof, said inner casing being also provided with perforations through the bottom wall thereof adapted to be closed through the engagement with the bottom of said outer casing, a cover for said inner casing, a clamping element pivoted to said handle and having a finger therefrom fitting the annular slot in said inner casing in its elevated position, said clamping element being provided with means adapted to receive pressure to free said finger from said slot.

Signed at the city of Toronto, this 1st day of April, 1920.

DONALD ARTHUR GALT.

Witnesses:
W. G. HAMMOND,
G. MURPHY.